United States Patent [19]

Ernst

[11] 4,223,853
[45] Sep. 23, 1980

[54] DEVICE FOR ROLLING ON AND OFF SAFETY BELTS, ESPECIALLY OF MOTOR VEHICLES

[75] Inventor: Hans-Hellmut Ernst, Sülfeld, Fed. Rep. of Germany

[73] Assignee: Autoflug GmbH, Rellingen, Fed. Rep. of Germany

[21] Appl. No.: 904,507

[22] Filed: May 10, 1978

[30] Foreign Application Priority Data

May 10, 1977 [DE] Fed. Rep. of Germany ....... 2720959

[51] Int. Cl.³ ...................... A62B 35/00; B65H 75/48
[52] U.S. Cl. .............. 242/107.4 R; 308/159; 308/230
[58] Field of Search .................. 242/107.4 R–107.4 E; 308/228, 229, 230, 163, 172, 159, 158; 280/806; 297/388

[56] References Cited

U.S. PATENT DOCUMENTS

| 349,956 | 9/1886 | Samuel | 308/158 |
|---|---|---|---|
| 518,447 | 4/1894 | Draper | 308/228 X |
| 931,069 | 8/1909 | Larrabee | 308/230 |
| 1,366,132 | 1/1921 | Pitkin | 308/159 X |
| 2,239,682 | 4/1941 | Marti | 308/159 X |
| 3,495,786 | 2/1970 | Hemens | 242/107.4 B X |

FOREIGN PATENT DOCUMENTS 321925  5/1919  Fed. Rep. of Germany .

Primary Examiner—John M. Jillions
Attorney, Agent, or Firm—Becker & Becker, Inc.

[57] ABSTRACT

A device for rolling on and off safety belts, especially a motor vehicles, which includes a housing and a shaft rotatably journalled in said housing and spring urged in the winding up direction of the safety belt. The safety belt by pulling thereof is adapted to be wound off the shaft against the thrust of the spring. The device is furthermore provided with an arrangement adapted in response to forces of a predetermined magnitude automatically to act upon the safety belt or the device. For absorbing the forces occurring during normal operation on one hand and during a blocking action on the other hand, the shaft is respectively differently journalled for absorbing the forces in axial direction and in radial direction.

3 Claims, 9 Drawing Figures

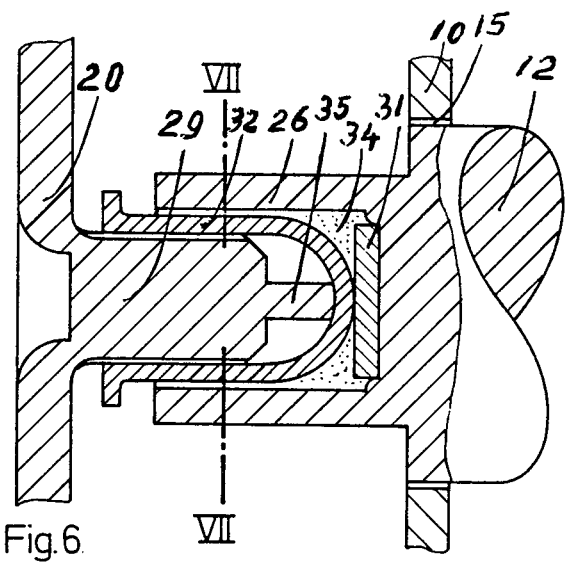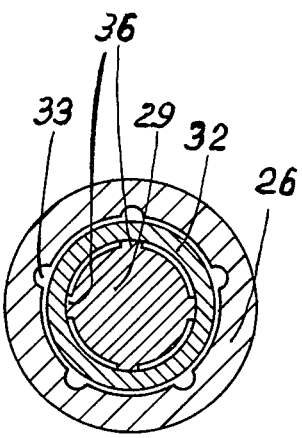
Fig. 6. Fig. 7
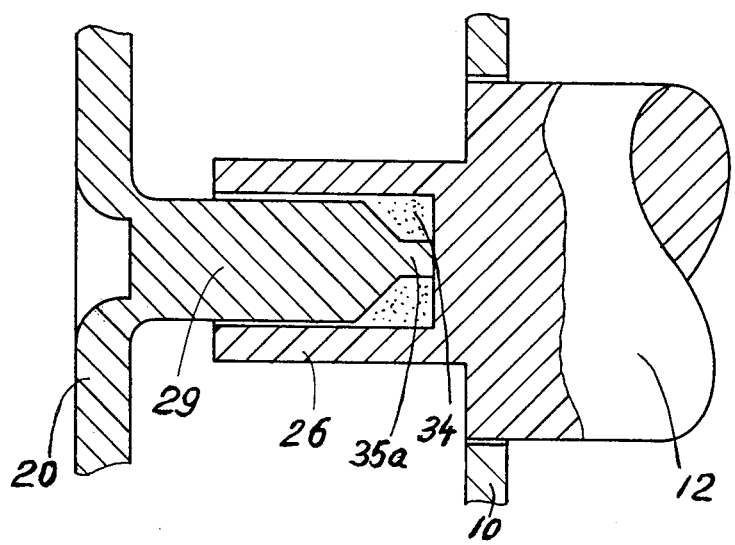
Fig. 8

DEVICE FOR ROLLING ON AND OFF SAFETY BELTS, ESPECIALLY OF MOTOR VEHICLES

The present invention relates to a device for winding up safety belts, especially safety belts for motor vehicles, according to which a housing is provided in which a shaft is rotatably journalled which is spring loaded in the winding-up direction of the belt. The belt is adapted to be wound up around said shaft and can be wound off said shaft against the thrust of the spring pulling said belt. The device according to the invention furthermore comprises a mechanism for automatically blocking the shaft when predetermined forces act upon the belt or the device.

Devices of the above mentioned type have become known in various designs. They differ from each other primarily in the design and mounting of the return spring for the safety belt which return spring acts upon the belt winding-up shaft. The said known designs furthermore differ from each other in the design and action of the device for automatically blocking the shaft in case of an accident or another factor which brings about a release of the blocking. In operation, all heretofore known belt winding-up devices have in common that they are frequently so actuated that a rotation of the belt winding-up shaft in one or the other direction of rotation occurs. With the heretofore known belt winding-up rollers the shaft is journalled in friction bearings of a relatively simple design while self-lubricating synthetic materials may be employed. In most instances, the shaft ends are journalled in corresponding circular recesses of the housing wall. All heretofore journals have inherent thereto the possibility that the shaft, especially after a longer use of the respective belt winding-up device will during its rotation create running noises, and when at a standstill will tend to knock or clatter when the vehicle drives for instance over a street with cobblestones or pot holes. All of these noises are nowadays considered annoying and accordingly as disadvantageous.

The heretofore known journalling of such shafts, however, has not only the drawback of causing annoying noises but are also in connection therewith subject to particular wear which can even bring about an actual knocking-out of the bearing. As a result thereof, the functional properties of the device may change, which inherently may cause a danger for the strapped-in passenger.

It is, therefore, an object of the present invention to provide a belt winding-up device with considerably improved silent operation when the belt is pulled out, i.e., when the belt is wound off the winding shaft, and when winding up the belt, in other words during the winding-up operation.

It is a further object of this invention to provide a belt winding-up device as set forth in the preceding paragraph which will greatly reduce the possibility of causing noises during the driving of the vehicle.

It is a still further object of this invention to provide a device as set forth in the two preceding paragraphs which will bring about a reduction in the wear of the mounting of the shaft.

These and other objects and advantages of the invention will appear more clearly from the following specification in connection with the accompanying drawings, in which:

FIG. 6 shows a still further embodiment of the bearing area with a ball-shaped mounting in the interior of the shaft end.

FIG. 7 represents a cross section taken along the line VII—VII of FIG. 6.

FIG. 8 is still another embodiment of the bearing area in the interior of the shaft end.

The device according to the invention for winding up a safety belt is characterized primarily in that the shaft for absorbing the forces acting thereupon during normal operation on one hand, and in case of blocking action on the other hand, is journalled in a different way in the axial direction and in the radial direction respectively.

If according to a particular embodiment of the invention, the holding means for the bearing are designed as cover caps for the belt winding-up spring and the blocking device, the extent to which the required caps can be subjected to loads without affecting the rolling properties of the device can be considerably increased. In this way, functional disturbances can be avoided when for instance when the foot of a person sitting in the rear of the vehicle or an article behind the front seats, for instance an attache' case, presses in customary manner upon the belt winding-up roller which is customarily mounted on the bottom of the passenger space.

According to a preferred embodiment of the invention, it is provided that the shaft for winding up the belt has its end face journalled on a ball-shaped mount. In this way, during the ordinary operation a particularly play-free journalling of the shaft will be obtained which in view of the continuous renewing effect of the contact points of the rotating ball is subjected to a considerably less wear. This mounting considerably contributes to reducing noises. While it is known in other arts to journal the end faces of shafts by means of balls, it will be appreciated that in connection with the said other art different problems are to be solved, particularly the suitable mounting of upright shafts which in their turn support relatively heavy structural elements whereby greater forces are exerted in the axial direction of the shaft upon the bearing area. The reduction of noise effects, however, is in connection with said prior art not at all essential.

Figure 1:
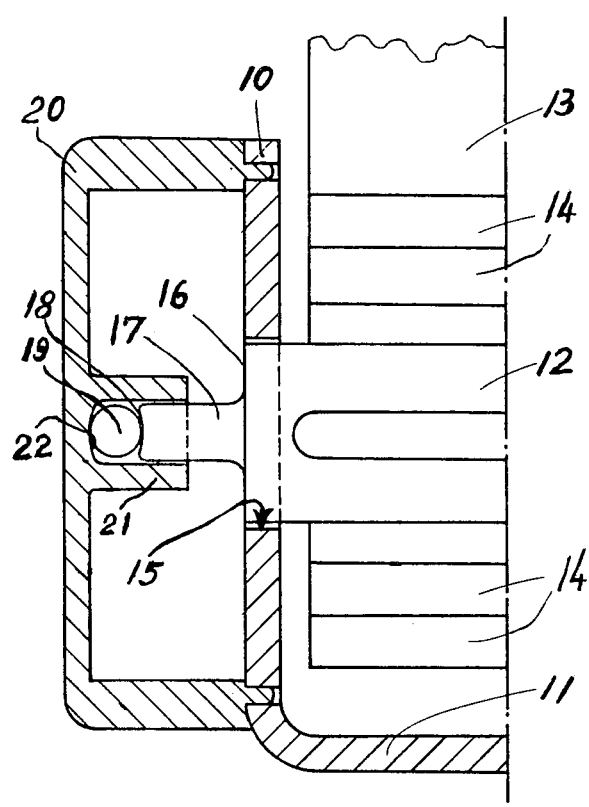
FIG. 1 illustrates the left hand section of a cross section through a belt winding-up roller within the region of the belt winding-up shaft.

Referring now to the drawings in detail, and to FIG. 1 in particular, the belt winding-up device shown therein is provided with a customary U-shaped housing having lateral legs 10 of which FIG. 1 shows only the left hand leg, and is furthermore provided with a transverse member 11 interconnecting the legs 10. A belt winding-up shaft 12 extends parallel to said transverse member 11 transverse through the housing 10, 11 upon which several layers 14 of a safety belt 13 are wound. Shaft 12 extends through the leg 10 on each side of the housing and more specifically through a circular opening 15 of a corresponding diameter. The rim portion of opening 15 surrounds the shaft surface with relatively large play. The opening 15 therefore does not serve for radially journalling the shaft 12 during the normal operation, which fact brings about the advantage that the housing 10,11 can be produced at relatively low cost inasmuch as neither the tolerance nor the quality of the punched surface of the openings 15 is of importance for the journalling proper.

The circular opening 15 in each housing leg 10 becomes functional as bearing area for shaft 12 only when the safety belt 13 is blocked, for instance during a collision. The forces occurring in such an instance are so great that the shaft surface while overcoming the play in the opening 15 will engage the housing leg 10 whereby the load introduced into the housing and thereby into the vehicle body to which the belt winding-up roller is connected.

The end face 16 of shaft 12 is provided with an axial extension 17 which preferably forms one piece with the shaft and the end face 18 of which in the illustrated embodiment is designed concave but may also be designed plane. A steel ball 19 has point contact with the concave surface 18 inasmuch as the radius of the ball 19 is less than the radius of the concavity of the surface 18.

An additional housing section 20 in the form of a cover cap with a high rim is in customary manner screwed onto the housing leg 10 (screw connection not shown) and for journalling the shaft 12 is in the axial direction of shaft 12 provided with a cylindrical sleeve 21 arranged on the inner side of cap 20 and preferably forming one piece therewith. The inner diameter of the sleeve 21 corresponds to the outer diameter of the extension 17 so that the extension 17 is mounted in sleeve 21 with slide fit. The sleeve 21 has a concave bottom 22 which with other embodiments may also be plane and has point contact with the ball 19. The ball 19 is thus clamped between the concave end face 18 of the extension 17 and the concave bottom 22 of sleeve 21. When the belt winding-up shaft 12 rotates, the ball 19 rotates more or less to the same extent. In view of the selected type of journalling, a continuous self-centering of the longitudinal axis of shaft 12 occurs.

Figure 2:
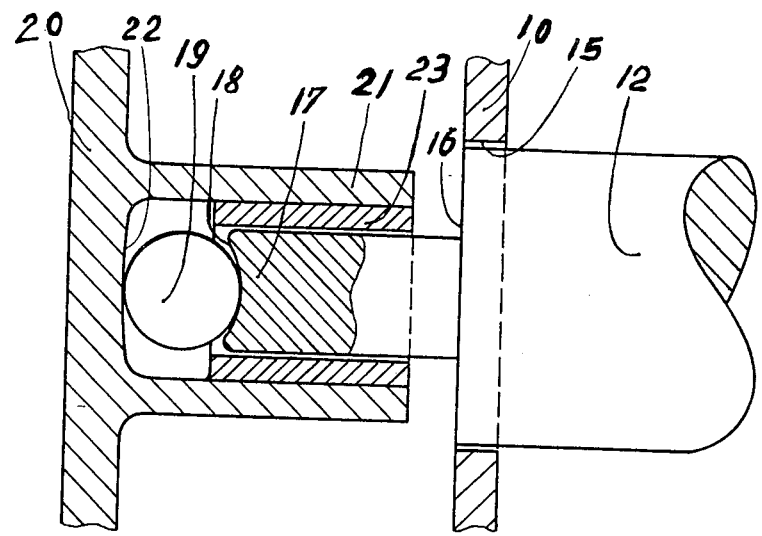
FIG. 2 shows the bearing section of one end of the belt winding-up shaft.

As will be seen from FIG. 2, the inner surface of sleeve 21 within the region of the shaft extension 17 may be lined with a chrome plated bushing 23 in order to further improve the running properties of the shaft. While the described journalling of shaft 12 in opening 15 of the housing leg 10 is provided only for an occasion in which greater forces act upon the shaft in radial direction, the journalling of shaft 12 by means of the extension 17 in sleeve 21 serves the function of the belt winding-up roller under normal conditions which means during the pulling out of the belt by the passenger when the latter wants to strap himself in or when the said already strapped-in passenger bends forwardly, for instance to turn on or to tune a radio. In a corresponding manner, the last mentioned bearing arrangement 17, 19, 21 serves for guiding shaft 12 during the winding-up of the safety belt 13. Thus, the operation is divided with regard to the holding of the shaft 12 and the guiding of the shaft 12 in conformity with forces acting upon the shaft. During the normal operation, the shaft is by means of its extension 17 journalled in sleeve 21 and here is guided axially as well as radially. In contrast thereto, in case of a blocking of the winding-up roller for the belt (collision), the shaft is journalled radially at the rim of the openings 15 of the housing legs 10.

For purposes of overcoming the play in the opening 15, the housing part 20 with the sleeve 21, or the sleeve 21 alone may be deformable to which end these parts are made for instance of a suitable material, especially synthetic material. The necessary slight displacement of the sleeve 21 for engaging the shaft 12 at the edge of the opening 15 can also be realized by a corresponding design of the connection of cap 20 to the housing 10,11.

Figure 3:
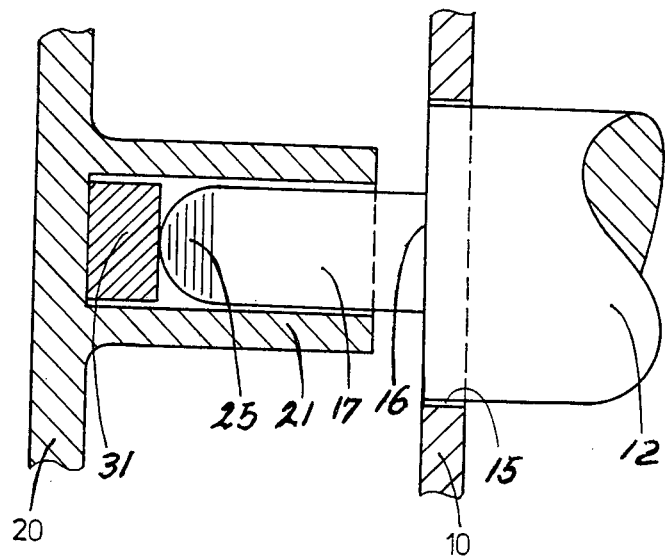
FIG. 3 represents a modification of the journalling area of the belt winding-up shaft.

In axial direction, the shaft 12 has no play in its journalling whereby a noise abatement to a considerable extent will be realized. At the same time, advantages are obtained with regard to the function capability of the belt rolling-up device during an inclined position for instance when driving on an inclined highway or when parking on a hill. In radial direction, the journalling for the journal 17, 19, 21, can also be designed with or without play. The radial journalling 10, 12, 15 has always so much play that the shaft 12 during normal operation will never abut the housing legs 10. From FIG. 4, it can be seen that the inner surface of sleeve 21 in the annular gusset between ball 19 and surface 18 is provided with a projection 24 which may form a continuous round section or may be formed by individual angularly spaced sections. In this way, an undercut is obtained for pre-mounting the ball 19 so that the latter after being inserted can no longer drop out of sleeve 21. The material of the sleeve 21, and the dimensions of the projection 24 have to be adapted to each other in such a way that the ball 19 can be introduced into sleeve 21 under a certain pressure. FIG. 3 shows another embodiment of the invention according to which no ball is provided. Instead, the end face of the extension 17 of shaft 12 is crowned and, more specifically, in the form of a hemisphere 25. The axial tip of said hemisphere engages the plane end face of a pressure plate 31 of hard, wear-resistant material as for instance steel, glass or ceramic. In this connection, the pressure plate 31 is arranged at the innermost point of the cylindrical sleeve 21. The sleeve 21 is generally designed in the same way as with the embodiment according to FIGS. 1 and 2. Also with the embodiment according to FIG. 3, a separate bearing bushing 23 may be provided.

Figure 5:
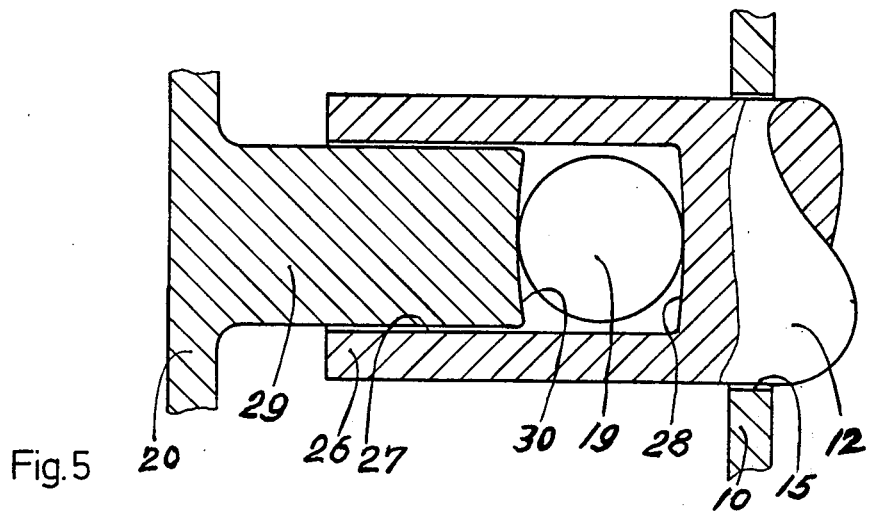
FIG. 5 represents a section through a bearing area, in which the ball is arranged within the interior of the shaft end.

Reverse structural conditions are shown in FIG. 5. With the embodiment of FIG. 5, the end of shaft 12 is designed as sleeve for receiving the ball 19 for which purpose the shaft end is provided with a bore 27 the inner end 28 of which has a concave, possibly also plane shaft. The ratio of the radius of the concavity of the lower end 28 to the concavity of ball 19 is the same as mentioned above. Formed to the inner side of the additional housing part 20 is an extension 29 the shape and dimensions of which correspond to the inner space of sleeve 26. The extension 29 has a concave end face 30 which is in point engagement with the ball 19. As a result thereof, with this embodiment, the ball 19 is clamped in between the concave surfaces 28 and 30. As far as the remaining parts are concerned, the same conditions prevail as with the previously described embodiments.

FIGS. 6 and 7 concern an embodiment according to which the belt winding-up shaft 12 has its end stepped and designed as sleeve 26. At the inner portion of sleeve 26 there is provided a pressure plate 31 of hard wear-resistant material. The extension 29 of the additional housing part 20 also in this instance extends into the sleeve 26 while there is interposed a cup-like bushing 32 of chromium plated steel, stainless steel, bronze or ceramic. The bushing 32 has a substantially spherical front end which rests against the pressure plate 31. The inner surface of sleeve 26, as shown in FIG. 7, is provided with recesses 33 which are designed as soil catching pockets. The gusset-shaped space between the crowned end of the bushing 32 and the pressure plate 31 comprises a filling 34 of lubricant.

The extension 29 is substantially cylindrical and has the function of a trunnion. At the end face there is provided an engaging pin 35 which engages the axially deepest area of the bushing 32. Arranged on the peripheral surface of the extension 29 are longitudinal ribs 36 on which the bushing 32 is mounted with a narrow tolerance. The embodiment according to FIGS. 6 and 7 is a particularly useful design.

According to FIG. 8, the tip 35a rests directly on the axially deepest portion of sleeve 26. Also with this embodiment, a central journalling of the shaft 12 can be obtained. The diameter of the tip 35a amounts for instance to from 2-3 mm.

Figure 4:
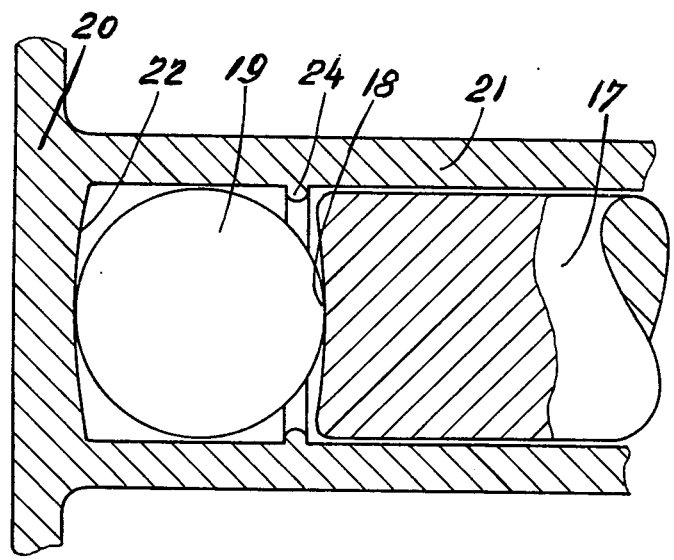
FIG. 4 illustrates the arrangement of a ball between the sleeve bottom and the end face of the shaft.
Figure 9:
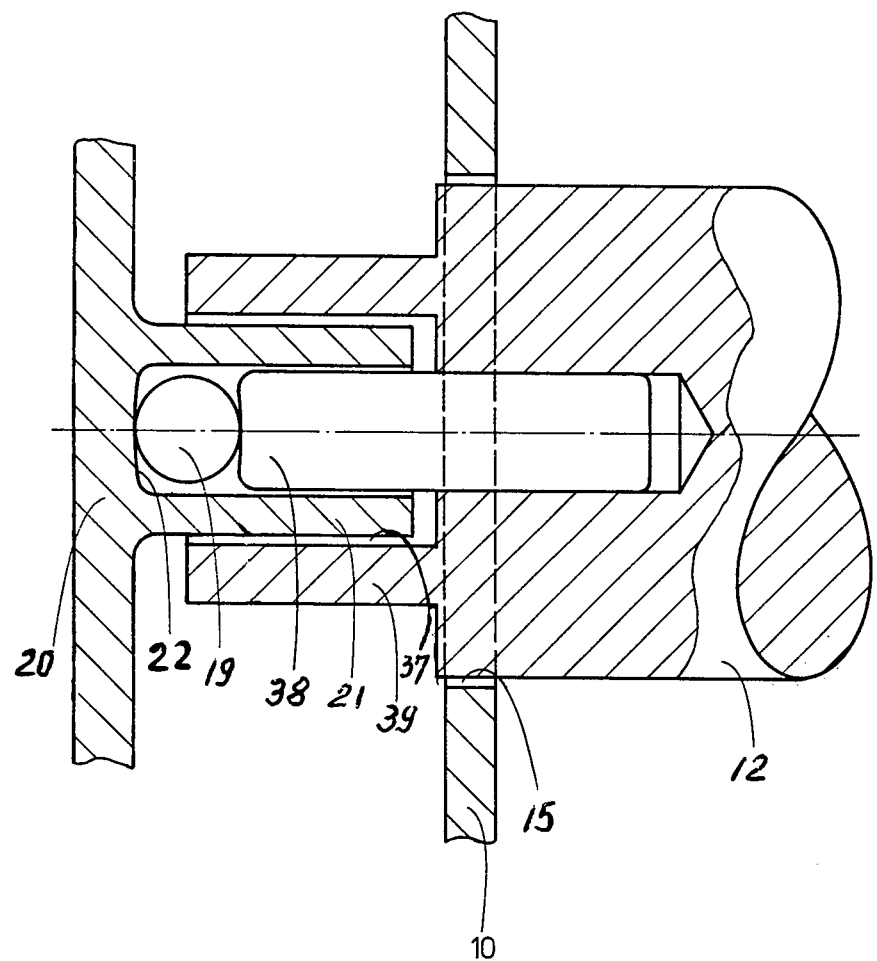
FIG. 9 shows a journalling of the shaft end by means of a cylindrical pin.

FIG. 9 shows an embodiment similar to that of FIGS. 1, 2 and 4 while, however, in axial direction a particularly compact design is realized. To this end, the sleeve 21 of the additional housing part 20 extends to a major extent into the bore 37 at the end of the belt winding-up shaft 12 while the journalling of the shaft is effected at the axially deepest portion of sleeve 21 by means of the ball 19. To this end, a separate bearing pin 38 is provided as for instance a standardized cylinder pin which is pressed into a corresponding bore of shaft 12. The bearing pin 38 centrally projects into the bore 37 where it is surrounded by the sleeve 21. In the relatively narrow space between the housing leg 10 and the additional housing part (cap) 20, the nonillustrated belt return spring may be mounted.

In designs proved in practice, the play between the surface of the belt winding-up shaft 12 and the marginal surface of the opening 15 in the housing leg 10 amounts to about 0.5 mm, which means that the diameter of the opening 15 is about 1 mm greater than the diameter of shaft 12. The fit between the shaft extension 17 and the sleeve 21 according to FIGS. 1,3 and 4 has a play of a maximum of 0.1 mm so that the distance between the surfaces on both sides will at most amount to 0.05 mm. This applies to the fit of the embodiments according to FIGS. 2, 5,6,8 and 9. The balls 19 have a diameter of about 6 mm. With all embodiments, the additional housing part 20 or the caps 20 customarily provided on both sides of the belt winding-up roller are provided with a light preload so that the bottoms 22 according to FIGS. 1, 2 and 4 in axial direction of shaft 12 press inwardly and thus clamp the shaft and balls 19 therebetween. Conditions also apply to the embodiment according to the other figures of the drawings. The caps 20 may consist of synthetic material.

For all embodiments there exists in the same manner also the possibility to design the radial journalling of shaft 12 on the additional housing 20 which may also be considered the holding means for the bearing area, so strong that during the normal operation and also during continuous test examination (10,000 blockings with about 30 kp pulling load) during the blocking, no contact of shaft 12 with the housing legs 10 occurs. Only with such a high load introduction as it occurs during an accident, the play in 15 will be overcome which means that the power transfer occurs directly from shaft 12 to housing 10, 11. On the other hand, the radial journalling may from the very start be designed so soft that also during the testing of blocking a contact between shaft and housing is effected. Inasmuch as in this instance, however, still a slight relative movement occurs between these two parts, steps have to be taken in order to check this sliding operation. A corresponding design of opening 15 in the housing legs as quasi-brearing area is also necessary. Fundamentally, the present invention provides a radial journalling with play by close tolerance, small dimensions of the parts on one hand and an axial bearing without play by means of tip or point-shaped contact on the other hand. In this way, the goal of a quiet-running shaft bearing in the housing of a safety belt winding-up device is realized while the shaft bearing is low in noise development and is wear-resistant.

As will be seen from the above, the safety belt of the device according to the invention for rolling a safety belt up and off has numerous advantages. Aside from the quiet running and the fact that clattering noises with harmful wear are avoided, a split-up between the operation of the different bearings is realized. One bearing takes over the local fixing of the shaft and guiding the same during the rotation, whereas the other bearing is intended to absorb the load in case of blocking, and for transferring the large forces inherent to said blocking into the housing and into the vehicle body. In view of this splitting up of the operation of different bearings, the first mentioned bearing can be designed nearly free from forces whereby a considerably increase in the continuous loadability can be realized. This in turn favors recent efforts to increase the so-called cycle number of presently 50,000 blockings to 150,000 or more blockings or even 200,000 blockings (Sweden). With the customary journalling of safety belt winding up and off shafts, such great numbers of blockings is impossible.

Further advantages of the present invention consist in that the journalling of the winding-up and off shaft is considerably improved over the heretofore known journalling so that the safety belt can be pulled out more easily and will also more easily wind itself up so that in other words a smaller hysteresis is obtained which benefits the comfort of use. Furthermore, the journalling of the shaft in its axial direction is improved which results in favorable effects with regard to the elimination of accelerations in transverse direction. The accessibility of the bearing areas is also improved over heretofore known bearing arrangements.

It is, of course, to be understood that the present invention is, by no means, limited to the specific showing in the drawings, but also comprises any modifications within the scope of the appended claims.

What I claim is:

1. A device for rolling a safety belt on and off, especially for use in motor and air vehicles, which includes in combination: a housing, a shaft rotatably double journalled differently within said housing during normal operation than blocking operation; a safety belt connected to said shaft and adapted to be wound onto said shaft; spring means continuously urging said shaft in the belt winding-up direction, said safety belt being adapted in response to a pull exerted thereupon to be wound off said shaft against the thrust of said spring; first bearing means axially disposed with respect to said shaft; second bearing means on said housing and in radial spaced relation with said shaft, wherein said first bearing means journals said shaft in the axial direction and radial direction when radial forces are relatively small during normal operation of said belt and wherein the second bearing means absorbs radial forces by direct support of said shaft on said housing during blocking of said shaft; said first bearing means including sleeves projecting from opposite ends of the shaft, each sleeve having an axial bearing surface at the end thereof and shaft-like extensions projecting from the housing in axial alignment with the shaft and sleeves, said shaft-like extensions being received in the sleeves; said first bearing means also including cup-like bushings disposed over the shaft-like extensions and within said sleeves, the cup-like extensions having spherical crowned bottom surfaces which abut the bearing surfaces in the sleeves to provide an axial journal.

2. The device of claim 1 wherein the sleeves have inner surfaces with soil collecting pockets therein.

3. A device in combination according to claim 1 or 2, in which between said bushing and the adjacent closed end portion of said bore a lubricant is contained thereby.

* * * * *